(12) United States Patent
Kawamoto

(10) Patent No.: US 8,782,666 B2
(45) Date of Patent: Jul. 15, 2014

(54) METHODS AND PLATFORMS FOR HIGHLY AVAILABLE EXECUTION OF COMPONENT SOFTWARE

(75) Inventor: Shinichi Kawamoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1510 days.

(21) Appl. No.: 11/288,265

(22) Filed: Nov. 29, 2005

(65) Prior Publication Data

US 2007/0006212 A1    Jan. 4, 2007

(30) Foreign Application Priority Data

May 31, 2005    (JP) ................................. 2005-158299

(51) Int. Cl.
*G06F 3/00*    (2006.01)
(52) U.S. Cl.
USPC .......................................................... 719/316
(58) Field of Classification Search
None
See application file for complete search history.

(56) References Cited

U.S. PATENT DOCUMENTS

| | | | | |
|---|---|---|---|---|
| 5,920,725 | A * | 7/1999 | Ma et al. ........................ | 717/171 |
| 7,266,816 | B1 * | 9/2007 | Sharma et al. ................. | 717/170 |
| 2002/0087612 | A1 * | 7/2002 | Harper et al. .................. | 709/100 |
| 2003/0131153 | A1 * | 7/2003 | Vu ................................. | 709/331 |
| 2003/0172370 | A1 * | 9/2003 | Satuloori et al. .............. | 717/120 |
| 2003/0204647 | A1 * | 10/2003 | Jacobs et al. ................... | 709/330 |
| 2003/0208641 | A1 * | 11/2003 | Wesemann ..................... | 709/332 |
| 2005/0005200 | A1 * | 1/2005 | Matena et al. .................. | 714/38 |
| 2005/0102615 | A1 * | 5/2005 | Roman et al. .................. | 715/513 |
| 2005/0114835 | A1 * | 5/2005 | Francis et al. ................. | 717/118 |

FOREIGN PATENT DOCUMENTS

| | | |
|---|---|---|
| JP | 8-77120 | 8/1994 |
| JP | 8-185318 | 7/1996 |
| JP | 2001-290637 | 4/2000 |
| JP | 2002-82926 | 9/2000 |
| JP | 2001-290637 | 10/2001 |
| JP | 2003-330742 | 11/2003 |

OTHER PUBLICATIONS

Candea, George, et al., "Microreboot—A Technique for Cheap Recovery", Appears in Proc. of the 6th Symposium on Operating Systems Design and Implementation (OSDI), Dec. 2004, pp. 1-44.

* cited by examiner

*Primary Examiner* — H S Sough
*Assistant Examiner* — Carina Yun
(74) *Attorney, Agent, or Firm* — Nicholas Trenkle; Stites & Harbison, PLLC.

(57) ABSTRACT

A method for executing component-based software includes creating a first relation between a first identifier identifying a first software component and an interface for a first container created for the first component, starting a second component defined as a substitution component for the first component when a replacement condition is met, creating a second relation between a second identifier identifying the second component and an interface for a second container created for the second component when starting the second component, changing the first identifier to the second identifier in the first relation and the second identifier to the first identifier in the second relation when starting the second component, using the first component to process requests to the first component received prior to completion of starting the second component, and using the second component to execute requests to the first component newly received after completion of starting the second component.

4 Claims, 14 Drawing Sheets

FIG. 3

```
1: Object o=initial.lookup("java:comp/env/ejb/A");
2: AHome home=(AHome) PortableRemoteObject.narrow(o, AHome.class);
3: ARemote remote=home.create();
4: remote.methodX(..)
```

FIG. 4

```
1: <replace-policy>
2:    <ejb-name>A</ejb-name>
3:    <alt-ejb-name>A</alt-ejb-name>
4:    <condition>
5:       <ttl>300s</ttl>
6:    <condition>
7:       <priority>3</priority>
8: </replace-policy>
```

FIG. 5

```
<condition>
   <max-calls>10000</max-calls>
</condition>
```

FIG. 6

```
<condition>
    <max-memory>90%</memory>
</condition>
```

FIG. 7

```
<condition>
    <exception>
        <type>*</type>
        <time>5</time>
    </exception>
</condition>
```

FIG. 8

```
void replace(String name1, String name2);
```

FIG. 12

| 610 | 611 | 612 | |
|---|---|---|---|
| EJB A | (TTL, 300) | 2004 9/24 15:28:32 | 620 |
| EJB B | (MaxCalls, 10000) | 2004 9/24 15:29:11 | 621 |
| | | | |
| | ⋮ | | |

| 710 | 711 | 712 | |
|---|---|---|---|
| EJB A | EJB A | 3 | 720 |
| EJB B | EJB Bnew | 5 | 721 |
| | | | |
| | ⋮ | | |

700

METHODS AND PLATFORMS FOR HIGHLY AVAILABLE EXECUTION OF COMPONENT SOFTWARE

CLAIM OF PRIORITY

The present application claims priority from Japanese Application JP 2005-158299 filed on May 31, 2005, the content of which is hereby incorporated by reference into this application.

FIELD OF THE INVENTION

The present relates to methods and platforms for highly available execution of component software consisting of a plurality of software components.

BACKGROUND OF THE INVENTION

The utilization of web applications using a web browser as the caller is rapidly expanding in many areas of use, from on-line shopping sites to the business systems of corporations. Today's web applications use a component-based structure combining a plurality of small-scale software components with a view to facilitating quick development and flexible functional modification. As platform techniques for such component applications, there are J2EE (Java 2 Enterprise Edition) (Java is a registered trademark of Sun Microsystems, Inc.) and .NET (registered trademark of Microsoft Corporation). The usual practice is to develop web applications by using one or both of J2EE and .NET. J2EE and .NET provide APIs (Application Programming Interfaces) for web applications, and the developers of web applications develop web applications by using these APIs. Web applications developed by using these APIs are executed on a platform for executing applications known as a J2EE server or a NET server. In the following paragraphs, component applications and a platform for their execution will be described, with J2EE taken up as an example.

Components in J2EE are referred to as EJBs (Enterprise Java Beans). Main EJBs include a session bean and an entity bean. The session bean is an EJB, which performs processing correspondingly to the user's session, while the entity bean is an EJB representing permanent data irrespective of the user's session. Entity bean data are usually stored in a database. EJBs are components stated in the Java language in accordance with the API of J2EE. An EJB supports two interfaces including a remote interface and a local interface to refer to itself from outside, such as another EJB. The remote interface is mainly used for calling the EJB deployed on a remote machine. On the other hand, the local interface is used for communication with a local EJB deployed on the same J2EE server. Which of the two interfaces can be used depends on the packaging of the EJB.

The configuration of a platform for execution of component software according to a known technique is shown in FIG. 2, with the J2EE server taken up as an example. Reference numeral 100 denotes an execution platform for component-based software; 110, a deployer; 300 and 320, containers each of which is an execution environment for EJB execution; 310 and 330, remote request receivers for receiving requests between containers; 311, a remote request sender for sending requests between containers; and 400, a name server. Reference numeral 200 denotes a file system, in which EJB class files 210 and 211 are to be arranged. In the example shown in FIG. 2, two files EJB A and EJB B are deployed in the J2EE server. Incidentally, though only one application execution platform is shown in this drawing, it is also possible to architect one application by making ready a plurality of application execution platforms and distributively deploying an EJB on each platform. The constituent elements shown in FIG. 2 will be described below.

The name server 400 is a server that manages the bindings between names and objects and supports functions of JNDI (Java Naming and Director Interface) APIs. The name server 400 has a table 401 and a name server controller 402. The table 401 has fields of names 411 and objects 412. The name server controller 402 provides JNDI APIs to the caller and realizes the functions of each API. The name server has the following four APIs.

(1) bind
(2) lookup
(3) rebind
(4) unbind

Of these APIs, "bind" registers pairs of a name N and an object O (N, O) each in the name server 400; "lookup" references the name server 400 by the name N and takes out the object O matching the name N; "rebind" changes the object part of the name N-object O pair (N, O) from O to On; and "unbind" removes the entry (N, O) of a name N from the name server. Two entries 421 and 422 are registered in the table 401 of the name server 400 of FIG. 2. Although the name server 400 is present in the application execution platform shown in FIG. 2, name server 400 may be present independent of the application execution platform.

The deployer 110 reads in EJBs from the file system and creates containers for the EJBs and remote request sender and receivers on that basis, referred to as deploying. When EJB A is to be deployed for instance, the deployer 110 reads in the class file 210 of EJB A from the file system 200, and creates the container 300, the remote A request receiver 310, and the remote A request sender 311 of EJB A. Then deployer 110 calls the "bind" API of the name server 400 and registers the pair of the name A of EJB A and remote interface IntConA of the container 300 (A, IntConA) in the name server 400 denoting the registered entry as 421. When EJB B is deployed in the same way, the deployer 110 reads in the class file 211 of EJB B from the file system 200, and creates the container 320, the remote B request receiver 330 and the remote B request sender (the remote B request sender will not be used hereinafter and accordingly is not shown in FIG. 2) of EJB B. Then deployer 110 calls the "bind" API of the name server 400 and registers the pair of the name of the component B and the remote interface IntConB of the container 320 (B, IntConB) in the name server 400 denoting the entry as 422.

The deployer has a function to undeploy any deployed EJB. To undeploy an EJB, first an EJB instance operating on the container of the EJB is discarded, and then the container, remote request receivers, and remote request sender are discarded.

The container 300 and the container 320 are execution environments for supporting the execution of an instance 301 of EJB A and an instance 321 of EJB B, respectively. The instances 301 and 321 are created in accordance with a "create" request from the caller.

The remote A request receiver 310 and the remote A request sender 311 are paired, and support communication for remote requests of EJB A from the caller. Similarly, the remote B request receiver 330 and the remote B request sender (not shown in FIG. 2) are paired, and support communication for remote requests of EJB B from the caller. The protocol of RMI (remote method invocation)-IIOP or the like is generally used for these communication processes. The remote request receivers (310 and 330) may constitute the skeleton of RMI, and the remote request sender (311), the stub of RMI. These pairs of remote request receivers and remote request senders are either automatically created by the J2EE server at the time of deploy or incorporation into the J2EE server from the outset.

The file system 200 is a file system of the OS by which the execution platform of component-based software 100 operates.

The class files 210 and 211 are object files of Java, and are obtained by compiling Java source codes with a Java compiler. Or these class filed consist of object files obtained by compilation and deployment descriptors for their deploying, archived as JAR files.

The description of a method call between EJBs with reference to a case in which the instance 321 of EJB B calls a method "methodX" of EJB A in FIG. 2. The codes for calling the method "methodX" of EJB A in EJB B are generally stated as shown in FIG. 3. First on the first and second rows of FIG. 3, the name server 400 is referenced by using the "lookup" API of JNDI, and the remote interface of the container A of EJB A matching the name A is acquired, the "home interface". Next on the third row, the "create" method of the home interface of EJB A is called. The call for the method "create" of the remote home interface reaches the container A 300 via the container B 320, the remote A request sender 311, and the remote A request receiver 310. The container A 300, upon receiving the create request, creates one instance 301 of EJB A, and returns the remote interface of this instance 301 of EJB A, the "component interface", as the return value to the instance 321 of EJB B via the remote A request receiver 310, the remote A request sender 311, and the container B 320. The component interface is received by the instance 321 of EJB B. Finally, when the instance 321 of EJB B calls on the fourth row the method "methodX" to the component interface of EJB A, that request reaches the instance 301 of EJB A via the container B 320, the remote A request sender 311, the remote A request receiver 310, and the container A 300. The called instance 301 of EJB A executes the method "methodX", and returns the result to the instance 321 of EJB B via the container A 300, the remote A request receiver 310, the remote A request sender 311, and the container B 320.

For the purposes of the present discussion, it was assumed that when EJB B is the caller of EJB A and is to communicate with the container A 300 by using the home interface of EJB A, EJB B communicates with the instance 301 of EJB A by using the component interface, the same remote request sender 311 and remote request receiver 310 would be used. The message for a remote request passing the remote request sender and the remote request receiver in order to realize such communication is composed as represented by 1100 in FIG. 17, wherein reference numeral 1101 denotes a target identifier indicating the target of access; 1102, the method to be called; and 1103, the list of method arguments of the method 1102. The target identifier is a container ID or an EJB instance ID. The remote request receiver (310 or 330) executes a request, when the target identifier 1101 of the message 1100 is a container ID, to the container or when it is an EJB instance ID, to the EJB instance. Depending on the packaging of the J2EE server, two types of remote request senders and remote request receivers may be used, one for the home interface and the other for the component interface.

While the foregoing description referred to a case in which an EJB provides a remote interface, where a local interface is to be provided, local receivers and local senders may as well be used in place of the remote request receivers and the remote request to make possible optimized low-cost communication, specialized for use within the same J2EE server.

Now, with the dissemination of such web application sites, competition among these sites is intensifying, and every site is pressed for quick modification and addition of functions to match customers' preferences. Quick modification and addition of functions requires development and testing within a limited period of time, and therefore adequate testing cannot always be done. Therefore, bugs are highly likely to remain in a web application already being operated, and such bugs may invite failures and stop the service. These bugs may invite failures in the system, and in the worst-case stop its service. Since the system failure of a web application caused by bugs or any other reason would inflict an enormous loss on the site, interest is now focused on methods of execution that can keep the website in service, even in the presence of bugs.

As is known to those possessing an ordinary skill in the pertinent arts, restarting the application can tentatively solve many of the failures invited by bugs, some of the sites operating web applications periodically restart their web applications to prevent failures.

Methods of efficient restoration from failures by implementing restarting at the level of components of fine grain size are disclosed in JP-A No. 82926/2002 (Patent document 1) and George Candea, et al., "A Microrebootable System—A Technique for Cheap Recovery, 6th Symposium on Operating Systems Design & Implementation 2004 (Non-patent document 1).

Patent document 1 discloses a remedial method for use in a component-based application by which codes for measuring the processing time are embedded into software components to monitor the reliability and performance of the system during its execution, the processing time is thereby measured, the components are determined to be in an abnormal state, if the measured processing time exceeds a preset threshold, and the components are blocked or restarted.

Non-patent document 1 discloses a technique known as microrebooting by which faster restoration from a failure is achieved as compared to restarting the whole application. This timesaving can be achieved by restarting only the failed component in which bugs or any other trouble has occurred, out of the components constituting the web application. This document also describes a method by which, if there is a sign of imminent failure, the likely failure is prevented at low cost by microrebooting the components.

On the other hand, restarting involves a problem that a processing request addressed to the restarted component would result in an error. As proposed solutions to this problem, JP-A No. 77120/1996 and JP-A No. 290637/2001 (respectively Patent documents 2 and 3) describe methods by which a new component is created in advance, instead of ending and restarting an existing component, and restoration from failure and prevention of error can be achieved at the same time by replacing the old component with the new.

According to Patent document 2, a monitoring process is allocated to each of the objects and instances constituting the application and monitors the status of execution of every object and instance, and any object or instance diagnosed to be abnormal is replaced with a substitute object or instance.

Patent document 3 discloses a method of replacing, in a multi-process multi-thread application, some components with new ones without stopping the application. By this method, all the processing threads for the components to be replaced are stopped temporarily, and the components are replaced when all the threads have been stopped.

However, these conventional techniques involve the following problems. First, there is a problem of deterioration in performance because, when any component is to be replaced, the whole processing on that component is stopped. Second, when the method of an EJB is to be called, as described above, the calling party successively acquires the home interface and the component interface of the EJB to be called, and finally makes the intended request. Any request to the EJB subsequent to the replacement of the call destination EJB should be executed on the new EJB having replaced the old one. However, if the call destination EJB is replaced immediately after the calling side has acquired the home interface or both the home interface and the component interface, any subsequent request will be attempted to be executed on the old EJB because the interface is that of the old EJB. If the old component is ended immediately after the EJB replacement, any request to that old EJB will end up as an error. A method which allows the old component to survive the EJB is conceivable, but since the home interface and the component interface for the old EJB may be kept alive by the caller's program for a long time, the attempt to prevent failure by replacing the EJB may fail, because the old component may not be completely ended and this might invite a failure.

Then, a first problem to be solved by the present invention is to provide a method for executing a component application to replace components adaptively to any sign of an imminent failure or the actual occurrence of a failure, which is a technique for component replacement which allows no error or no deterioration in performance to occur at the time of replacing components. A second problem to be solved by the invention is that of the interfaces posing a difficulty in component replacement.

SUMMARY OF THE INVENTION

The present invention solves these problems by providing a technique for having every request to a component executed by a new component from the moment it replaces the old component.

The substitutive component is defined for every component in advance, and so are conditions that presage the occurrence of a failure in each component.

An application execution platform has a monitor which monitors the state of each component and the execution platform's own state; a condition checker which checks on the basis of information from the monitor whether or not a condition defined for each component is met; a controller which performs control to replace any component which the condition checker finds meeting the condition with a designated substitute component; a duplication deployer which deploys in duplication a component similar to a component already deployed on the application execution platform; a communication controller which controls communication between components; and a name server which has a function to atomically replace names and objects of two entries.

On the application execution platform, the monitor monitors the state of each component and the execution platform's own state, the condition checker checks on the basis of the result of monitoring whether or not a condition defined for each component is met and, if the condition of a certain component A is met, the controller replaces that component A with a substitutive component B.

To accomplish the replacement, first the instance of the substitutive component B is created by the duplication deployer on the application execution platform, and a pair of the interface of that instance and a name B that uniquely identifies that instance is registered in the name server. Then, by using the replacing function of the name server, the name A of a registered component currently in operation is replaced with the interface part of the name B of the newly registered substitutive component, to enable thereafter the interface of the instance of the substitutive component B to be obtained by the name A. Next, the communication controller so replaces the destination of communication as to address the communication to the component A thereafter to the substitutive component B. Finally, the completion of all the processing being executed by the instance of the component A is awaited; upon completion, the instance of the component A is ended; and, at the same time, the entry comprising the instance and the name B is deleted from name server.

By the method for execution of component-based software according to the invention, when the occurrence of any specific component is presaged, a substitute component for the old component is newly deployed and, upon completion of the deploy, every new request to the component is thereafter processed by the new component, any processing being executed by the old component continues to be executed by the old component; upon completion of all the processing by the old component, the operation of the old component is ended. The replacement of the old component with the new can be thereby accomplished without stopping the processing, resulting in avoidance of any performance deterioration and prevention of any failure from occurring by the component replacement. Furthermore, the communication processing to send processing received from the caller to a component is made indirect and, even if the caller has the interface of the component and makes a request by using that interface, that request is sent to the new component, not the old component, to be processed by the new component, with the result that the component replacement can be accomplished in a shorter period of time, enabling secure failure prevention to be realized.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts:

FIG. 3 shows part of a caller program for calling the remote method of an EJB;

FIG. 4 shows an example of substitution definition file of an EJB according to an aspect of the present invention;

FIG. 5 shows an example of replacement condition for the substitution definition file of the EJB according to an aspect of the present invention;

FIG. 6 shows an example of replacement condition for the substitution definition file of the EJB according to an aspect of the present invention;

FIG. 7 shows an example of replacement condition for the substitution definition file of the EJB according to an aspect of the present invention;

FIG. 8 shows the specification of a "replace" API added to the name server according to an aspect of the present invention;

FIG. 12 shows a condition table in which the check condition for each EJB is to be recorded by a condition checker newly added according to an aspect of the present invention;

FIG. 13 shows a substitution table in which the substitutive EJB for and the priority of each EJB are recorded in a controller newly added according to an aspect of the present invention;

DETAILED DESCRIPTION

It is to be understood that the figures and descriptions of the present invention have been simplified to illustrate elements that are relevant for a clear understanding of the present invention, while eliminating, for the purpose of clarity, many other elements found in the methods and platforms associated with component software. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

An execution platform for component-based software capable of achieving highly available operation without sacrificing performance has been realized in the fewest practicable man-hours, based on a J2EE server which is an existing execution platform of component-based software, by adding a number of modules to and partially modifying the J2EE server.

Figure 1:
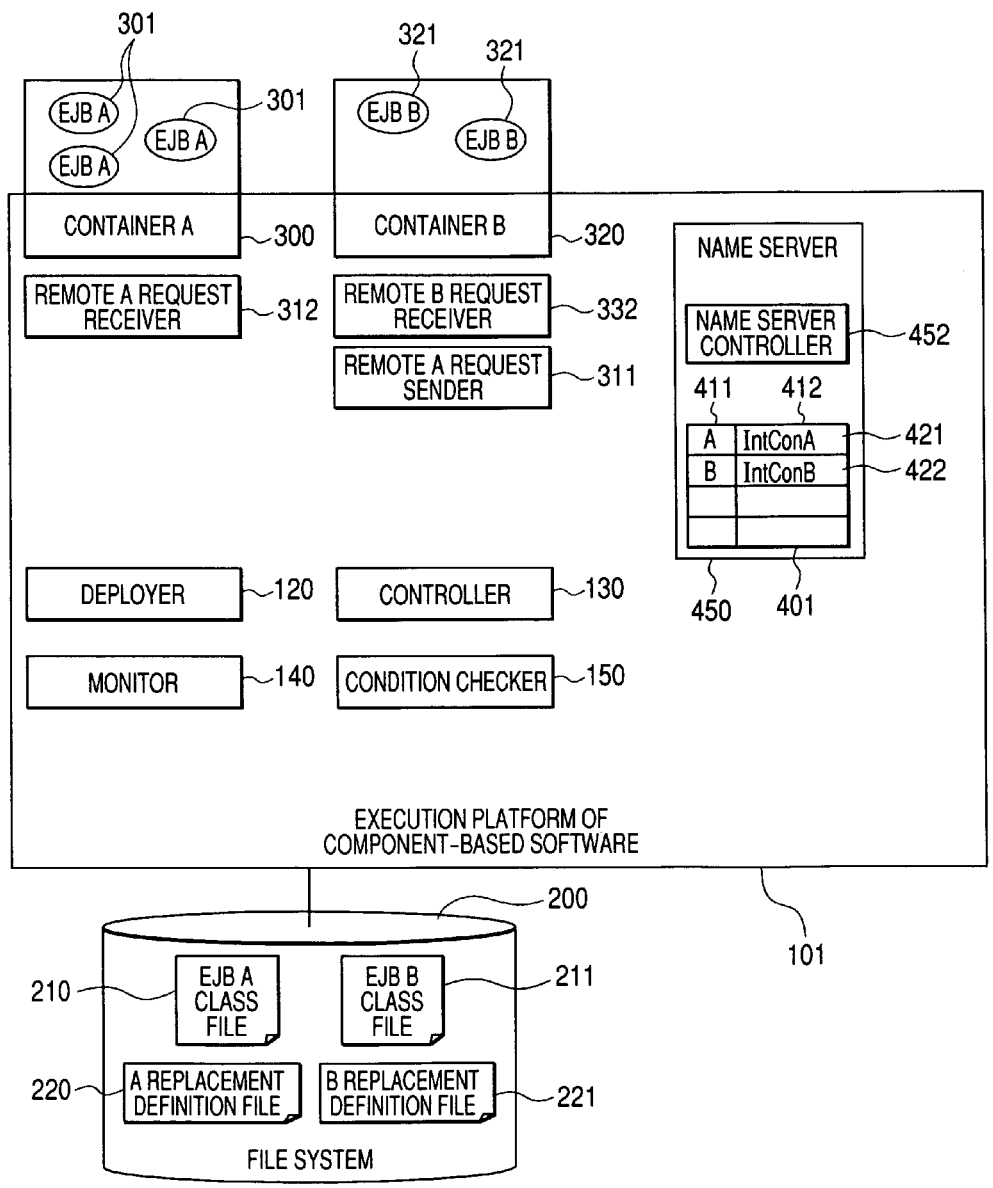
FIG. 1 illustrates a method for highly available execution of component-based software and a method for implementation of an execution platform.

FIG. 1 shows the configuration of an execution platform of component-based software according to an aspect of the present invention. Reference numerals 200, 210, 211, 300, 301, 311, 320 and 321 denote respectively the same elements as in FIG. 2 referred to above. Reference numeral 120 denotes a deployer provided with a function to deploy the same EJB in duplication in addition to the function of the deployer 110 shown in FIG. 2; 130, a controller for controlling the substitution of EJBs; 140, a monitor for monitoring the state of each EJB, that of the execution platform of component-based software and that of the OS in which the execution platform of component-based software operates; and 150, a condition checker for checking whether or not the condition prescribed for each EJB is met on the basis of various information obtained through the monitoring by the monitor 140. Reference numeral 312 denotes a remote A request receiver, a functionally expanded version of the remote A request receiver 310 of FIG. 2; 332, a remote B request receiver, a functionally expanded version of the remote B request receiver 330 of FIG. 2; and 450, a name server, a functionally augmented version of the name server 400 of FIG. 2. Reference numeral 220 denotes an A substitution definition file which defines a substitutive EJB and replacement conditions for EJB A; and 221, a B substitution definition file which defines a substitutive EJB and replacement conditions for EJB B.

(1) Name Server

Figure 2:
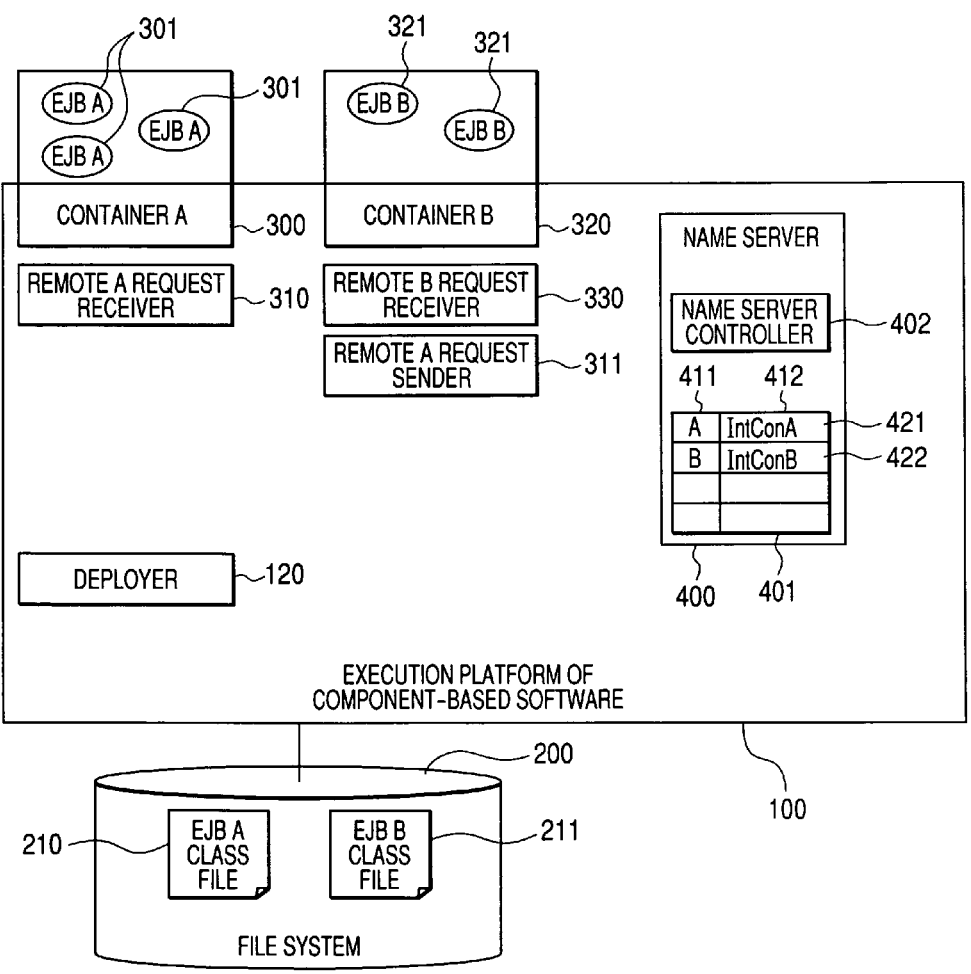
FIG. 2 illustrates a conventional execution platform for component-based software.

The name server 450 is a functionally augmented version of the name server 400 of FIG. 2. The table 401 is exactly the same as the table of FIG. 2. A controller 452 has an API called "replace" shown in FIG. 8 and the function to process it in addition to all the APIs supported by the name server controller 402 of FIG. 2. The main APIs supported by the controller 452 are listed below.

(1) bind
(2) lookup
(3) rebind
(4) unbind
(5) replace

Figure 9:
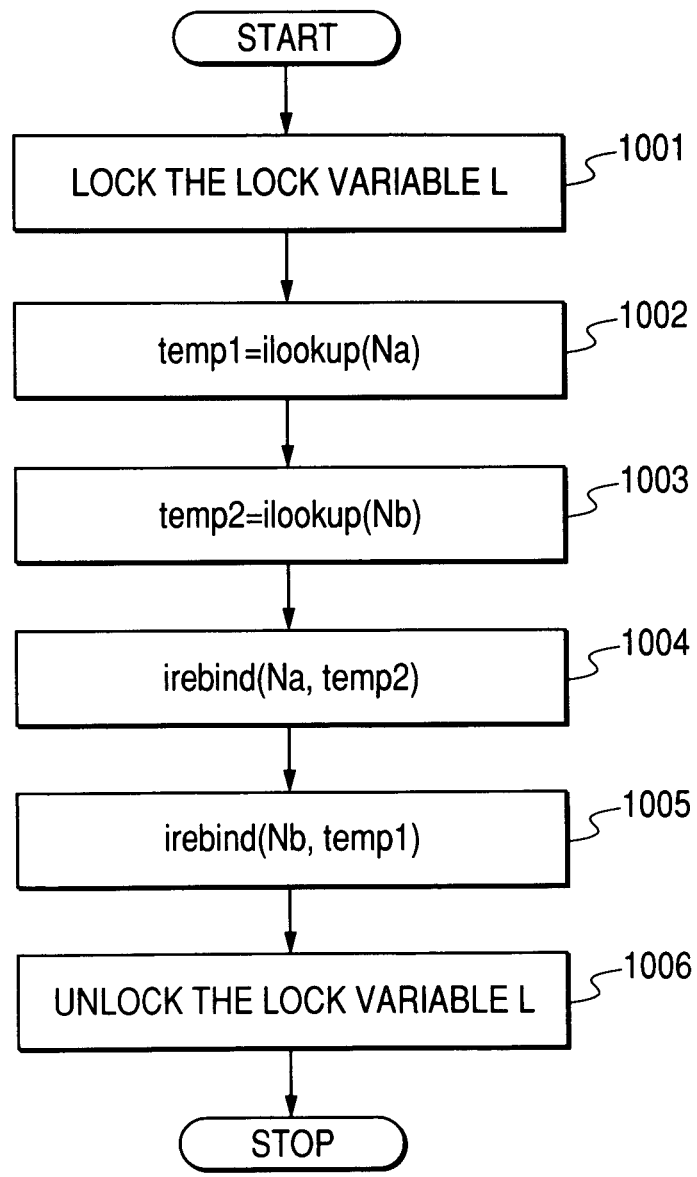
FIG. 9 shows a processing flow to realize the "replace" API added to the name server according to an aspect of the present invention.

As will be described in further detail below, the processing of existing APIs including "bind" is modified to be atomic. The "replace" API takes two names, name 1 and name 2, as arguments, and atomically replaces objects of entries whose name registered in the table 401 is name 1 with objects of entries whose name registered therein is name 2. For instance, where a pair of name Na and object Oa (Na, Oa) and another of name Nb and object Ob (Nb, Ob) are registered in the table 401 and "replace" (Na, Nb) is called, the two entries are turned into (Na, Ob) and (Nb, Oa). This "replace" processing can be achieved by combining "lookup" with "rebind". First, Na and Nb are looked up to and objects Oa and Ob are taken out. Then, Ob is rebound to name Na and Oa is subjected to "rebind" to name Nb. However, if "lookup", "rebind" or "unbind" processing arises apart from "replace" processing during the execution of processing by these APIs, there may occur a problem, such as inconsistency in the table. To address this problem, first a lock variable L is provided in the controller 452. The conventional "bind", "lookup", "rebind", and "unbind" are respectively renamed ibind, ilookup, irebind, and iunbind, and "bind" and "lookup" are achieved by combining the lock variable with ibind and ilookup, respectively. FIG. 9 shows the processing flow of replace (Na, Nb). First, the lock variable L is locked at 1001. If the lock variable L is already locked with other processing, a time delay occurs awaiting the availability of unlocking lock variable L.

Figure 10:
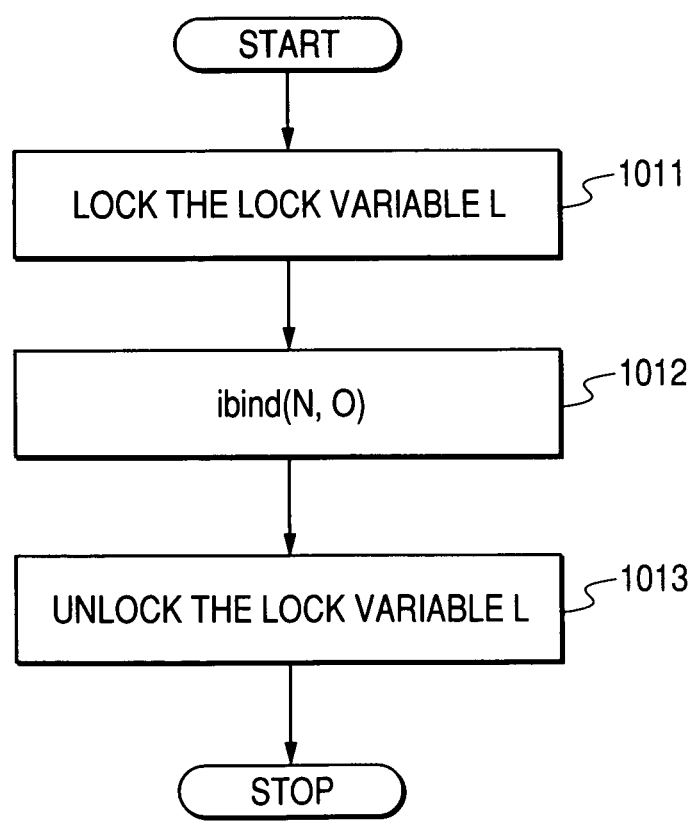
FIG. 10 shows a processing flow to realize the "bind" API of the name server according to an aspect of the present invention.
Figure 19:
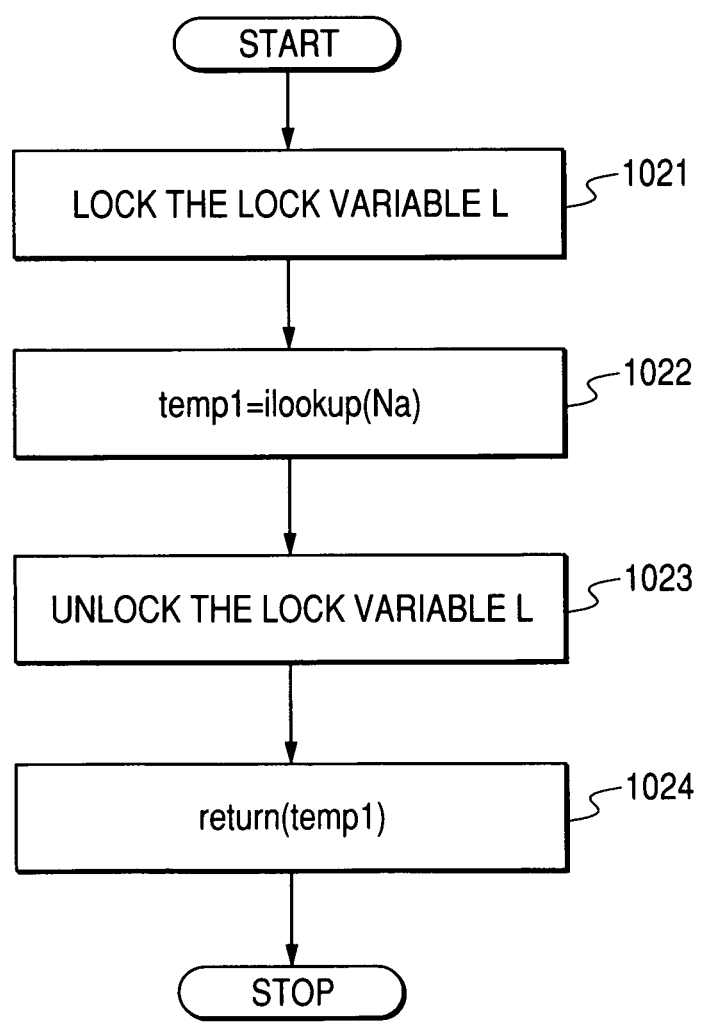
FIG. 19 shows a processing flow to realize the "lookup" API function of the name server for use according to an aspect of the present invention.

Then at 1002, the object paired with a name Na is taken out by ilookup (Na) and stored into temp1. Next at 1003, the object paired with a name Nb is taken out by ilookup (Nb) and stored into temp2. At 1004, the object name Na is replaced by irebind (Na, temp2), and at 1005, the object of name Nb is replaced by irebind (Nb, temp1). Finally at 1006, the lock variable L is unlocked. FIG. 10 shows the processing flow of "bind" (N, O). First at 1011, the lock variable L is locked, ibind (N, O) is executed at 1012, and the lock variable L is unlocked at 1013. The same applies to "rebind" (N, O) and "unbind" (N); this can be realized by replacing "rebind" (N, O) and "unbind" (N) at 1012 with irebind (N, O) and iunbind (N), respectively. FIG. 19 shows the processing flow of "lookup" (Na). At 1021, the lock variable L is locked, ilookup (Na) is executed at 1022, the lock variable L is unlocked at 1023, and the object obtained as a result of the execution of 1022 is returned at 1024.

(2) Substitution Definition File

The substitution definition files 220 and 221 are stated in XML as shown in FIG. 4, and comprises such items as EJB name (2nd row), substitutive EJB name (3rd row), replacement conditions (4th to 6th rows), priority (7th row). FIG. 4, defining substitution regarding EJB A, designates EJB A as the substitutive component (namely replaces it with another component of the same EJB) and a replacement condition of 300 seconds (5th row) as the life-time, which means replacement in 300 seconds from the time of deploy, for example. The priority is used for determining the sequence of substitutive EJBs when replacement conditions are met for a plurality of EJBs at conflicting times. As replacement conditions, in addition to the life-time shown in FIG. 4, the conditions shown in FIG. 5, FIG. 6, and FIG. 7 can be designated. FIG. 5 shows respective cases in which replacement is executed when the number of EJB calls has reached 10000; FIG. 6, when the memory occupancy of the OS has surpassed 90%; and FIG. 7, when exceptions (of any type) has occurred five times in EJB A. A combined condition can also be designated by combining a plurality of such conditions by "and" or "or". The definition files 220 and 221, though stated in XML here, may be in any other standard or unique form. Further, though EJB A substitution definition and EJB B substitution definition are stated as separate substitution definition files in FIG. 1, a number of EJB substitution definitions may be stated collectively in a single file. Instead of using a file or files, a user file into which these values are to be entered may be provided to enable the user to enter them into it.

(3) Deployer

The deployer 120, which is a functionally extended version of the deployer 110 of FIG. 2, reads in class files and substitution definition files, and deploys EJBs. The following description will refer to a case in which EJB A is deployed, by way of example. When EJB A is not deployed on an execution platform of component-based software 101, its operation is substantially the same as that of the deployer 110 of FIG. 2 described above. Thus, the class file 210 of EJB A is read in from the file system 200, and creates the container 300, the remote A request receiver 312, and the remote A request sender 311 of EJB A. The deployer then calls "bind" API of the name server 450 and registers a pair of the name A of EJB A and the remote interface IntConA of the container 300 (A, IntConA) in the name server 450. Next, the deployer reads in the A substitution definition file 220, sets the EJB name, the substitutive EJB name, and the priority in the controller 130, and sets the EJB name, the replacement condition, and the current time in the condition checker 150.

Figure 11:
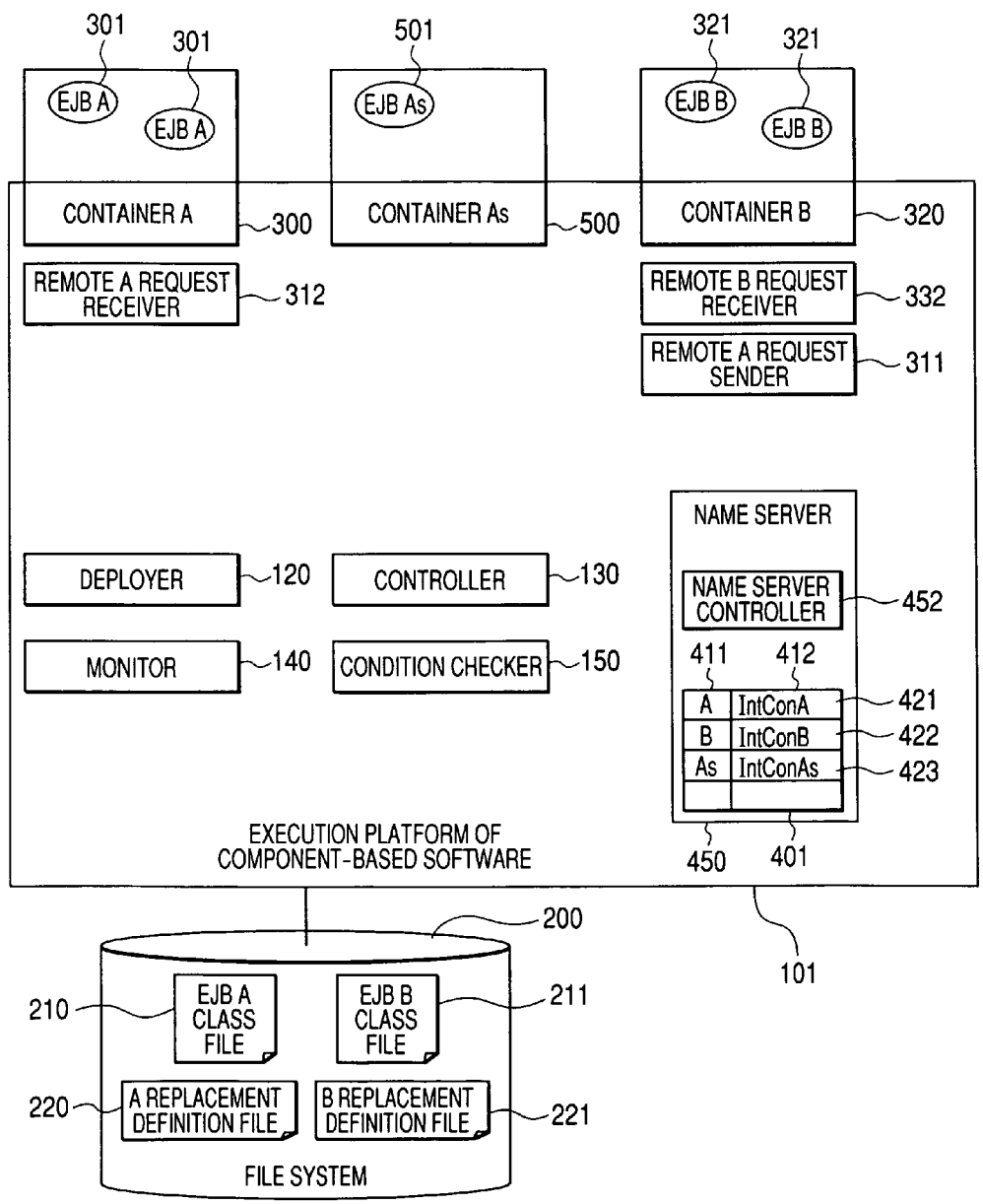
FIG. 11 illustrates a component-based software execution platform with EJB A deployed by a deployer, whose function is modified according to an aspect of the present invention, in duplication over the EJB A already deployed on the component-based software execution platform.

A configuration in which EJB A is already deployed on the component-based software platform 101 will be described with reference to FIG. 11. FIG. 11 shows a configuration in which EJB A is deployed in duplication on the component-based software platform 101 of FIG. 1 wherein EJB A and EJB B are already deployed, and the only different elements are 500, 501, and 512. The deployer 120 reads the class files of EJB A from the file system 200, and creates a new container As 500, remote As receiver 512, remote As sender (not shown) for EJB A separately from the already deployed container A 300, remote A request receiver 310, and remote A sender (not shown in FIG. 1). Then, the deployer 120 creates a name As, which does not duplicate the name A of EJB A, by adding a numeral to the original name A. This numeral is obtained by providing the deployer 120 with a counter for each EJB and incrementing each counter by 1 every time an EJB A is deployed in duplication. This numeral need not be managed by the counters within the deployer 120, but may be managed by an external Db. Also, a specific string of characters, or the indication of the time, may be used instead of a numeral. The pair so created of the name As and the remote interface IntConAs of the container As 500 (As, IntConAs) is registered in the name server 450 by "bind" API of the name server 450. Next, the deployer 120 reads in the A substitution definition file 220, sets the EJB name, the substitutive EJB name, and the priority in the controller 130, and sets the EJB name, the replacement condition, and the current time in the condition checker 150. If there is no definition file, the setting of the controller 130 and the condition checker 150 mentioned above will not be performed.

The creation of the remote request receivers (312 and 332) by the deployer 120 will be described in the following statement of the remote request receivers (312 and 332).

The deployer 120 has an undeploy function. Undeploying involves the discarding of the instance of the EJB to be undeployed, and the discarding of the container, the remote request receivers and the remote request senders. In addition to this undeploy function, the deployer 120 also perform a partial undeploy. A partial undeploy means that only the instance and the container of the EJB to be undeployed are discarded but neither the remote request receivers nor the remote request senders are discarded.

(4) Monitor

The monitor 140 measures periodically or systematically, for instance every 30 seconds, the number of times each EJB has been called, the occurrence of any exception or error, and the memory occupancy rate of the OS. The measurement of the number of times each EJB has been called can be achieved providing an integral counter in each of the containers 300, 320, and 500, and incrementing the pertinent counter by 1 each time the EJB is called. For exceptions and errors, vectors are disposed in the containers 330, 320, and 500, and the type of any exception or error that has occurred, the name of the method and the calling time are additionally written therein. Methods to return these counters and lists are prepared in the containers, and these methods are periodically called by the monitor 140 to acquire information. The memory occupancy rate of the OS is calculated by using any API that is ready on the execution platform of component-based software or, if there is no such ready API, issuing a system call to the OS to acquire the memory size used by the execution platform of component-based software and the maximum memory size, from which the occupancy rate is calculated. The monitor 140 has methods getcount, getEvent, and getMem to acquire these number of EJB calls, exception and error occurrence, and memory occupancy rate, respectively, from outside.

(5) Condition Checker

The condition checker 150 checks at regular intervals, such as for example every minute, to determine whether the replacement condition of each EJB is met. The condition checker 150 has a condition table 600 shown in FIG. 12. The condition table 600 is composed of three fields including those of EJB name 610, replacement condition 611, and deploy time 612. FIG. 12 shows a state in which two entries 620 and 621 are registered. These entries are entered in the condition table 600 when the deployer 120 deploys an EJB. The entry 620 shows the replacement condition of EJB A, which means that a replacement will be executed when the deploy duration has surpassed 300 seconds. To check the deploy duration, the field 612 for the deploy time is used. The entry 621 shows the replacement condition of EJB B, which means that a replacement will be executed when the number of EJB B calls has surpassed 10000.

The condition checker 150 successively checks whether each of the entries in the condition table 600 meets the replacement condition. When the replacement condition is based on the deploy duration, if the difference between the current time and the deploy time 612 registered in the condition table 600 is longer than the designated duration, that replacement condition will be deemed to be met. When the replacement condition is based on the number of EJB calls, method getcount in the monitor 140 is called, and if it is found greater than the designated value, that replacement condition will be deemed to be met. When the replacement condition is based on the number of exceptions and errors, method getEvent of the monitor 140 is called to acquire exception and error information, the designated number of exceptions and errors is referenced, and if the actual number is found greater than the designated number, that replacement condition will be deemed to be met. When the replacement condition is based on the memory occupancy rate, method getMem of the monitor 140 is called to acquire the memory occupancy rate, and if it is found higher than the designated memory occupancy rate, that replacement condition will be deemed to be met. This check sequence is applied to every entry in the condition table 600. The controller 130 is called by using the list of EJB names for which the replacement conditions have been met as arguments.

(6) Remote Request Receivers

The remote A request receiver 312 and the remote B request receiver 332 (hereinafter referred to as remote request receivers) are functionally augmented versions of the remote A request receiver 310 and the remote B request receiver 330, respectively, of FIG. 2. They are respectively paired with the remote A request sender 311 and a remote B request sender (not shown) (hereinafter referred to as remote request senders) to realize remote communication between EJB A and EJB B. The remote request receivers are realized as the skeleton of RMI and the remote request senders, as the stubs of RMI. The remote A request sender 311 and the remote B request sender (not shown) are known RMI stubs. They are automatically created by using a known RMI compiler rmic when the deployer 120 deploys EJB A and EJB B. The method parallels the known method used by deployer 110. The remote A request receiver 312 and the remote B request receiver 332 constitute a functionally augmented version of a known RMI skeleton.

Figure 14:
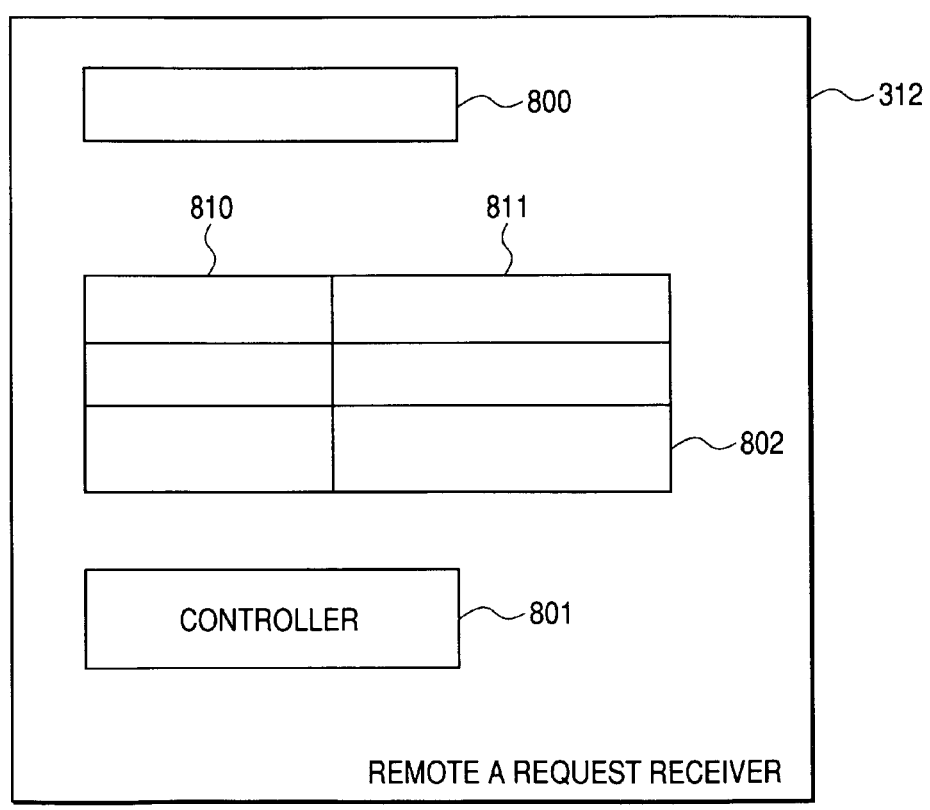
FIG. 14 shows the configuration of a remote request receiver whose function is modified according to an aspect of the present invention.

FIG. 14 shows the configuration of the remote A request receiver 312. The remote A request receiver is formed by adding a container reference variable 800, a controller 801, and an EJB instance reference table 802 to the remote A request receiver 310 of FIG. 2 and partially modifying the communication function. The initial value of the container reference variable 800 is NULL. This variable is used for supporting the container switching. The controller 801 supports setContainer method. When setContainer method is called by using a container as the argument, the controller 801 writes the container designated by the argument over the container reference variable 800. The EJB instance reference table 802 is a table including fields of the old EJB instance ID 810 and the new EJB instance ID 811, and is used for recording the relationship between the old instance and the new instance at the time of container replacement. When setContainer method of the controller 801 is called, the EJB instance reference table 802 is initialized, cleared of all its entries.

Figure 17:
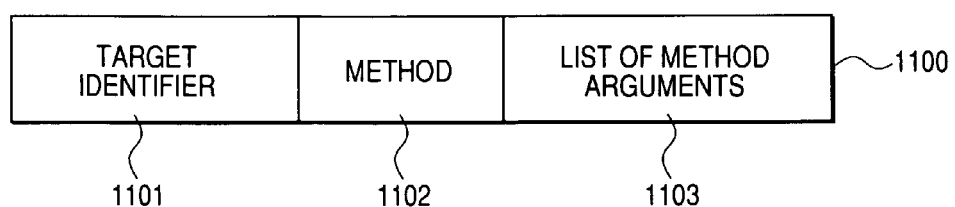
FIG. 17 is a schematic diagram showing a message to be exchanged between a remote request sender and a remote request receiver.

The message of request exchanged between the remote A request receiver 312 and the remote A request sender 311 is the same as the aforementioned message 1100 (FIG. 17) exchanged between the remote A request receiver 310 and the remote A request sender 311. The remote A request receiver 312, when it receives the message 1100 from the remote A request sender 311, checks whether or not the container reference variable 800 is NULL; if it is NULL, the receiver checks the target identifier 1101 of the message 1100; and if the target identifier is a container ID, the receiver calls, together with an argument 1103, the method 1102 of the default container A 300 indicated by the container ID. If the target identifier is an EJB instance ID, the method 1102 of the instance 301 of EJB A identified by the target identifier 1101 on the default container A 300 is called together with the argument 1103.

If the container reference variable 800 is not NULL and the target identifier of the message 1100 is a container ID, the method 1102 of the container identified by the container reference variable 800 is called together with the argument 1103. If the target identifier is an EJB instance ID, first the EJB instance reference table 802 is referenced to check whether there is an identical entry in the old EJB instance ID 810 field with the target identifier 1101 of the message 1100 and, if there is, the method 1102 of the EJB instance on the container identified by the container reference variable 800 identified by the new EJB instance ID 811 of that entry is called together with the argument 1103. If no entry identical with that entry is found in the EJB instance reference table 802, a "create" method is issued to the container identified by the container reference variable 800 to create one EJB instance on that container, and a pair of the target identifier 1101 of the message and the identifier of the EJB instance created as a result of "create" is registered in the EJB instance reference table 802. The switching of remote request is achieved in this way by replacing the default container with the designated container as the access target when a container is registered in the container reference variable.

The remote request receivers 312, 332 are automatically created when the deployer 120 deploys EJB A or EJB B. The method is similar to known methods by which the deployer 110 of FIG. 2 creates the conventional remote request receivers 310, 330. A difference in the use of a RMI compiler rmic subjected to an extension procedure by which a code for realizing the aforementioned container switching control is embedded into a usual skeleton code. Alternatively, the usual RMI compiler rmic may be used for skeleton creation, followed by embedding of the container switching control into the created skeleton code.

(7) Controller

Figure 20:
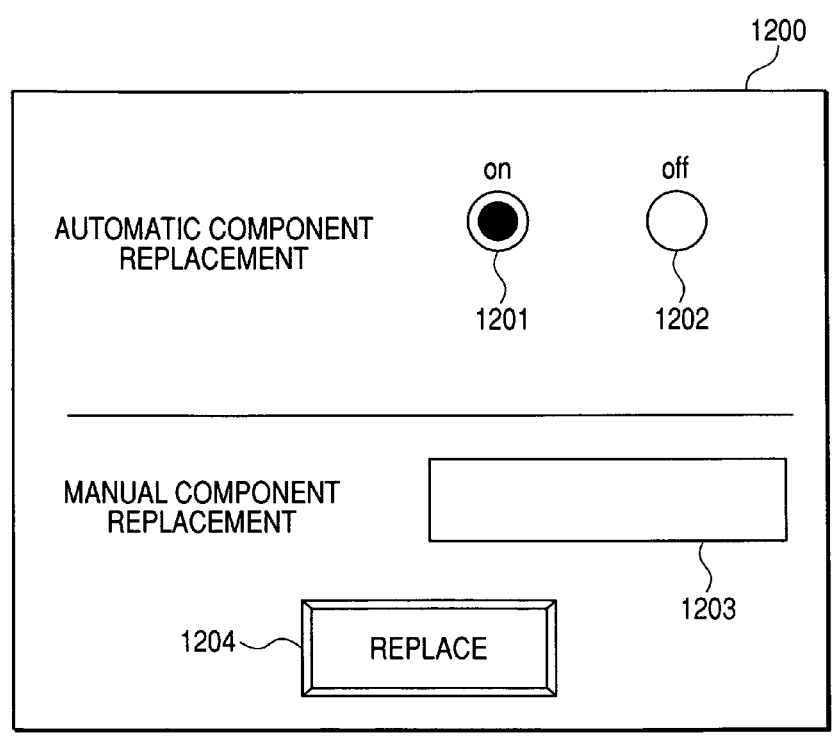
FIG. 20 schematically shows the interface of the controller for use according to an aspect of the present invention.

The controller 130 performs EJB replacement. The controller has a substitution table 700 of FIG. 13 and a user interface 1200 of FIG. 20.

The substitution table 700 has fields of EJB name 710, substitutive EJB name 711, and priority 712. The deployer 120, when it deploys any EJB, reads the substitution definition files 220 and 221, and registers the values in the substitution table 700. When EJB A is deployed, the registered entry number is 720, or when EJB B is deployed, the entry number is 721. The entry 720 shows that the substitution EJB for EJB A is EJB A, and its priority is 3. The entry 721 shows that the substitution EJB for EJB B is EJB Bnew, and its priority is 5.

The user interface 1200 is an interface to enable the user to perform setting regarding the replacement of components on the execution platform of component-based software 101. The user interface 1200 supports a setting for automatic replacement and a setting for manual replacement. Automatic setting is to instruct that the replacement of components is to be performed automatically. A button 1201 indicates that automatic replacement is to be performed, and a button 1202 indicates that no automatic replacement is to be performed. Only one or the other of these buttons can be selected. In the state shown in FIG. 20, the button 1201 indicating performance of replacement is selected, and in this case the controller 130 executes replacement of the identified components. Where the button 1202 is selected, no component is replaced. Where manual replacement is set, the component to be replaced is designated in an input box 1203, and a button 1204 is pressed. Then, as will be described with respect to phase 2 of component replacement processing, the entered component is replaced with a substitute component. The user interface may either be a graphical user interface (GUI) as denoted by 1200 in FIG. 20 or a command line interface (CUI), or a combination of both GUI and CUI may be supported. Also, instead of the user selecting, selection may be made by another program operating the GUI or the CUI.

(Component Replacement Processing)

Component replacement comprises phase 1 and phase 2 as described below.

(Phase 1)

The controller 130 is called by the condition checker 150. The condition checker hands over to the controller 130 EJB names that meet the replacement conditions in a list form. The controller 130 references this list, takes out the priority of every EJB in the list from the substitution table 700, and replaces EJBs in the descending order of priority. If there are two or more EJBs in the same position in the order of priority, the selection may be made at random or by using some other prioritization method. EJBs are replaced thereafter in a determined sequence. For instance, one may be replaced at a time using 10-second intervals or they may be successively replaced without intervals.

(Phase 2)

Figure 15:
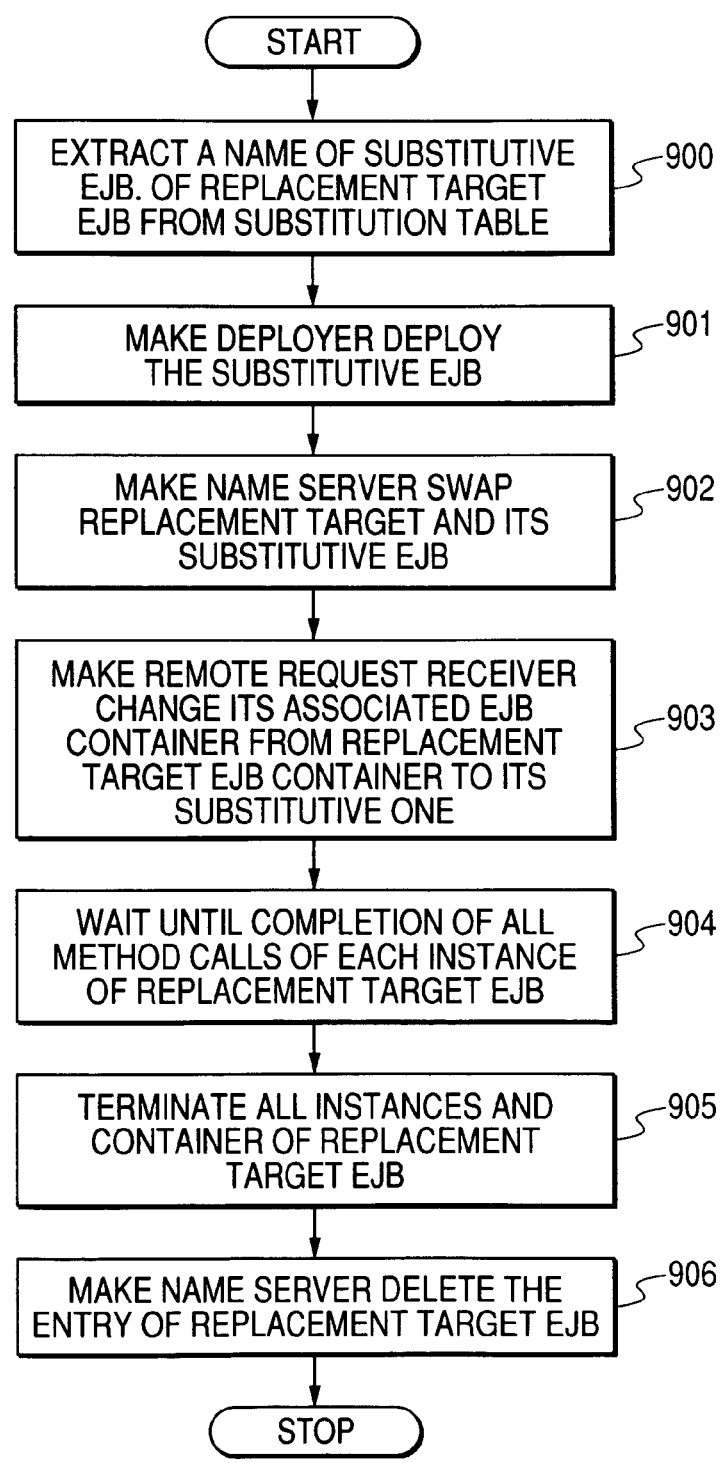
FIG. 15 shows a processing flow of substitution by the controller newly added according to an aspect of the present invention to replace an EJB with a substitutive EJB.
Figure 16:
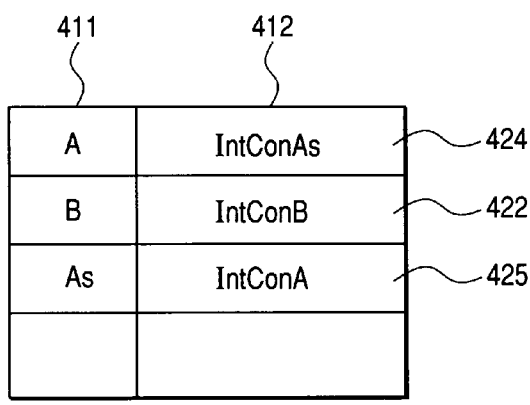
FIG. 16 is a table of name servers, showing entries obtained as a result of the execution of the "replace" API newly added according to an aspect of the present invention.

The processing method will be described below with reference to a case of replacing EJB A as an example. The replacement processing is executed in the flow shown in FIG. 15. First at step 900, the substitution table 700 is referenced and a substitutive EJB, which is the replacement target EJB, is removed. In the case of EJB A, EJB A itself is the substitutive EJB. Then at 901, the deployer 120 is instructed to deploy EJB A, which is the substitution EJB for EJB A. As the substitution EJB A is the same as EJB A, the deployer 120 deploys the containers in duplication. The execution platform of component-based software after the deployment will take the form of 101 in FIG. 11, wherein reference numeral 500 denotes the container As of EJB A deployed in duplication, and 512, the remote As receiver of EJB A (sign As is used in place of A to aid in distinguishing). Although reference numeral 501 in FIG. 11 denotes the instance of EJB A on the container As 500, the instance is not yet created by this point of time. Then the deployer 120 adds an entry 423 to the name server 450. Next the controller 130, at step 902, calls the "replace" API of the name server 450 with the name A of the replacement target EJB A and the name As of the newly deployed substitutive EJB A as the arguments. Entries in the table 401 of the name server 450 will be made as shown in FIG. 16. Reference numeral 424 denotes a pair of the name A and the container As of the newly deployed EJB A, and 425, a pair of the name As and the old container A. Next the controller 130, at step 903, calls the setContainer method of the remote A request receiver 312 with the container As 500 as the argument. The container reference variable 800 of the remote A request receiver 312 is rewritten from NULL to the container As 500. Thereafter any request via the remote request receiver 312 is executed in the container As 500. Next the controller 130, at step 904, waits until all processing being executed in the container A 300 is completed and, at step 905, calls the partial undeploy function of the deployer 120 to undeploy the instance 301 of the old EJB A and the container 300. Finally at step 906, it calls the "unbind" API of the name server 450 with the name As as the argument, and deletes the entry (As, IntConA) 425 from the name server 450. This completes the replacement processing of EJB A.

(Remote Request)

The description has so far mainly focused on the replacement processing of EJB A. Now will be described the operation from the viewpoint of calling the method of EJB A by EJB B, which is the caller. First, part of the request code of EJB A in EJB B is supposed to be as shown in FIG. 3. Referring to FIG. 1, after the instance 321 of EJB B first executes the first two rows of FIG. 3, the name server 450 is referenced to search for an entry whose name field is A. As a result, the home interface IntConA of the container A registered in the object field of the entry 421 is obtained. The instance 321 executes the third row of FIG. 3, and calls the "create" remote method of the home interface IntConA obtained by "lookup". This remote request is sent via the container B 320 to the remote A request sender 311, where it is converted into the message 1100 to reach the remote request receiver 312. The target identifier 1101 of the message 1100 is the container A 312, and the method 1102 is "create". The remote A request receiver, upon receiving this message, first references the container reference variable 800 and, as its value is NULL, calls the create method of the container A 312 identified by the target identifier 1101 of the message 1100.

The container A 312 creates the instance 301 of EJB A, and returns the component interface of the instance to the instance 321 of EJB B via the container A 300, the remote A request receiver 312, the remote A request sender 311, and the container B. The instance 321 then executes the fourth row of FIG. 3, and calls the "methodX" remote method of the instance 301 of EJB A. This request is sent to the remote A request sender 311 via the container B 320, and converted into the message 1100. Here the target identifier of the message 1100 is the instance 301 of EJB A, and the method 1102 is "methodX". When this message 1100 arrives at the remote A request receiver 312, the remote A request receiver 312 first references the container reference variable 800 and, as its value is NULL, the "methodX" method of the instance 301 of EJB A identified by the target identifier 1101 of the message 1100 is called. The result is returned to the instance 321 of EJB B via the container A 300, the remote A request receiver 312, the remote A request sender 311, and the container B.

Figure 18:
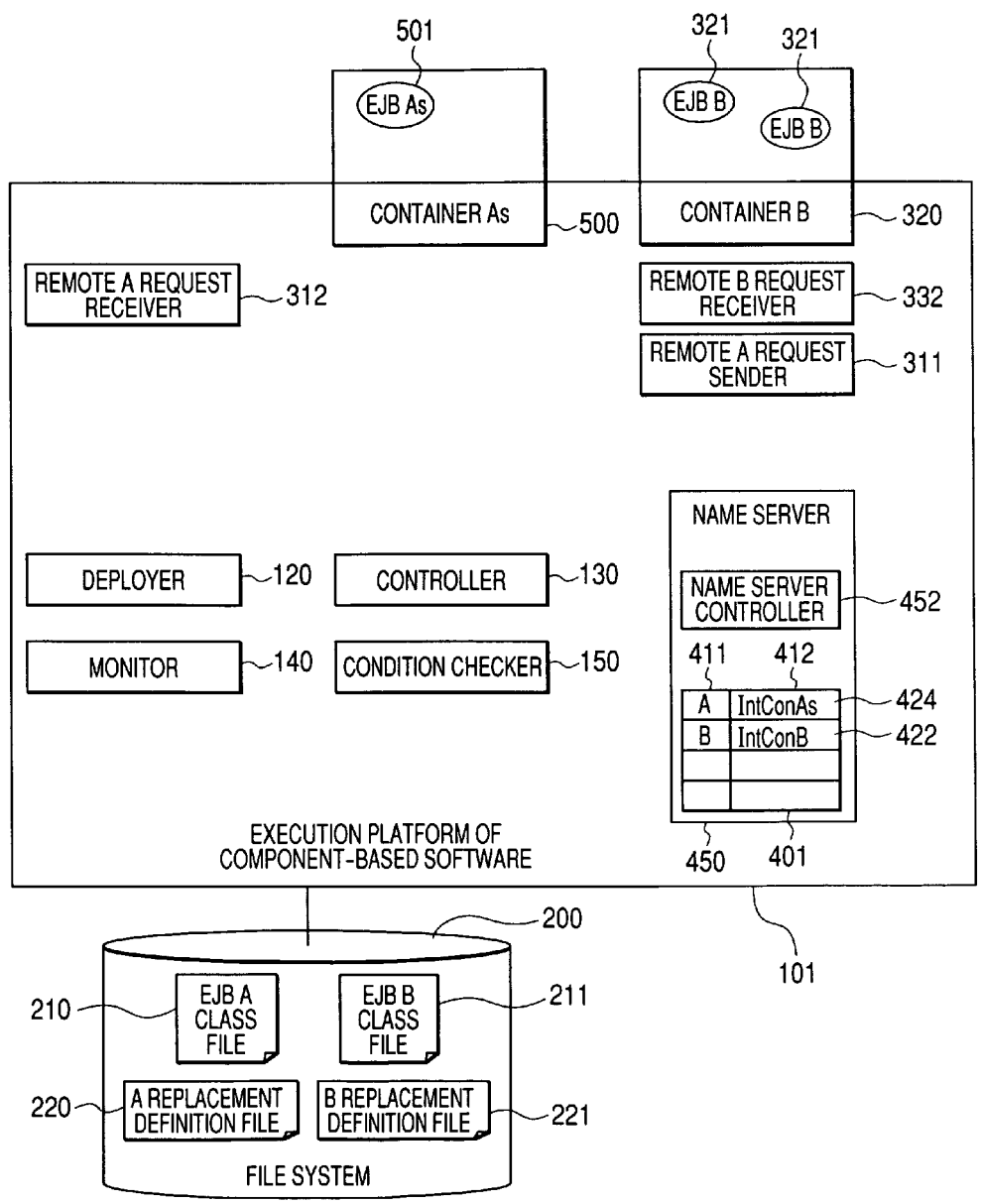
FIG. 18 illustrates an execution platform of component-based software after the execution of processing of EJB A replacement by the controller newly added according to an aspect of the present invention.

Next, the execution platform of component-based software on which the replacement condition of EJB A is met, and the controller 130 has executed and completed the replacement of EJB A is shown in FIG. 18. The container A 300 is replaced by the container A 500. The name A of the name server 450 is replaced by the remote interface IntConAs. Into the container reference variable 800 of the remote A request receiver 312 is stored the container As 500. It is supposed here that the aforementioned EJB B again calls the methodX remote method on the fourth row of FIG. 3 to EJB A. Then, as in the above-described case, a message is prepared and handed over to the remote A request receiver 312 (even after the container replacement, the remote A request sender 311 is paired with the remote A request receiver 312 and cannot communicate with the remote As sender 512). The remote A request receiver 312 first references the container reference variable 800 and, as the value is not NULL, searches the EJB instance reference table 802 for any entry corresponding to the target identifier 1101 of the message 1100. As there is none, the create method of the container As 500 identified by the container reference variable 800 is executed to create the instance 501 of EJB A on the container As 500. The identifier of the instance 301 on the container A stored in the target identifier 1101 of the message 1100 and the identifier of the just created instance 501 are paired and registered in the EJB instance reference table 802, the method "methodX" of the instance 501 is executed, and the obtained value is returned to the instance 321. In this way, all the requests using the home interface or the remote interface acquired before the container replacement will be executed on the new instance of the new container.

Finally, a case in which a new instance 321 differing from the aforementioned instance 321 of EJB B calls the "methodX" remote method of EJB A by executing the code of FIG. 3 in the state shown in FIG. 18 after the EJB A replacement will be described. Referring to FIG. 18, the new instance 321 of EJB B, first executing the first two rows of FIG. 3, issues "lookup" to the name server 450, and an entry whose name field is A is searched for. As a result, the home interface IntConAs of the container As registered in the object field of the entry 424 is obtained. The new instance 321 executes the third line of FIG. 3, and calls the "create" remote method of the home interface IntConAs. This remote request is sent via the container B 320 to the remote A request sender 311, where it is converted into the message 1100, and reaches the remote As receiver 512. The target identifier 1101 of the message 1100 is the container As 500, and the method 1102 is "create". Upon receiving this message, the remote As receiver 512 references the container reference variable 800 and, as its value is NULL, calls the "create" method of the container As 500 identified by the target identifier 1101 of the message 1100. The container As 500 creates the instance 501 of EJB A, and returns the component interface of the instance to the new instance 321 of EJB B via the container As 500, the remote As receiver 512, the remote A request sender 311, and the container B 320. The new instance 321 then executes the fourth row of FIG. 3, and the "methodX" remote request of the instance 501 of EJB A is processed. After the containers are replaced, the remote request having executed the program beginning with "lookup" of the name server is executed in the new container As.

The execution platform provided with the method for highly available execution of component-based software according to the invention can be utilized as application platform software for executing a broad range of applications. In particular, it can also be utilized as application platform software for the execution of mission-critical applications that require high availability.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A method for execution of component-based software including a plurality of software components, said method comprising:
    managing respective correspondence relations for the plurality of software components in which the respective correspondence relation for each of the plurality of software components includes an identifier of the software component and an interface for a corresponding container as execution environments for the software component;
    creating, on an execution platform for the component-based software, a first container as an execution environment for a first software component included within the plurality of software components;
    creating a first correspondence relation between a first identifier identifying the first software component and a first interface for the first container;
    using the first software component to process requests to the first software component on the first container via reference to the first correspondence relation;
    defining a second software component included within the plurality of software components as a substitution component for the first software component included within the plurality of software components;
    starting said second software component when at least one replacement condition for the first software component is met or a replace instruction is received;
    creating, on the execution platform, a second container as an execution environment for the second software component when starting the second software component;
    creating a second correspondence relation between a second identifier identifying the second software component and a second interface for the second container;
    changing the first identifier of the first software component to the second identifier of the second software component in the first correspondence relation and the second identifier of the second software component to the first identifier of the first software component in the second correspondence relation when starting the second software component;
    using the first software component to process requests to the first software component received prior to completion of starting the second software component;
    referencing the second correspondence relation based on the first identifier of the first software component in the second correspondence relation for requests to the first software component newly received after completion of starting the second software component;
    using the second software component on the second container to execute the requests to the first software component newly received after completion of starting the second software component via the second interface for the second container in the second correspondence relation;
    terminating the first software component upon completion of processing all the requests received prior to completion of starting the second software component; and
    deleting the first container from the execution platform upon termination of the first software component.

2. The method for execution of component-based software, according to claim 1, wherein said starting of said second software component occurs in advance of starting of execution of the newly received requests.

3. The method for execution of component-based software, according to claim 1, wherein said second software component is identical to the first component.

4. The method for execution of component-based software, according to claim 1,
    wherein a client acquires a reference to the first software component suitable for issuing a request to the first software component, before said starting of the second software component is completed; and
    wherein said second software component executes the newly received requests when the reference is called after said starting of the second software component is completed.

* * * * *